United States Patent
Holmes

Patent Number: 5,031,735
Date of Patent: Jul. 16, 1991

[54] MANUAL OVERRIDE FOR AUTOMATED MECHANICAL TRANSMISSION

[75] Inventor: Russell C. Holmes, Troy, Mich.

[73] Assignee: Eaton Corporation, Cleveland, Ohio

[21] Appl. No.: 446,347

[22] Filed: Dec. 5, 1989

[51] Int. Cl.[5] .......................................... B60K 41/22
[52] U.S. Cl. ...................................... 192/3.57; 192/83
[58] Field of Search ..................... 192/3.51, 83, 3.57

[56] References Cited

U.S. PATENT DOCUMENTS

| | | | |
|---|---|---|---|
| 3,105,395 | 10/1963 | Perkins | 74/745 |
| 3,352,392 | 11/1967 | Black et al. | 192/866 |
| 3,478,851 | 11/1969 | Smyth et al. | |
| 3,752,282 | 8/1973 | Espenshield | 192/83 X |
| 3,776,048 | 12/1973 | Enomoto et al. | 74/866 |
| 3,863,518 | 2/1975 | Webber et al. | 192/3.51 X |
| 3,937,108 | 2/1976 | Will | 74/866 |
| 4,038,889 | 8/1977 | Lindow et al. | 74/866 |
| 4,081,065 | 3/1978 | Smyth et al. | 192/0.076 |
| 4,208,929 | 6/1980 | Heino et al. | 74/866 X |
| 4,226,295 | 10/1980 | Rembold et al. | 180/335 |
| 4,361,060 | 11/1982 | Smyth | 192/0.092 X |
| 4,425,620 | 1/1984 | Batcheller et al. | 192/3.28 X |
| 4,551,802 | 11/1985 | Smyth | 364/424.1 |
| 4,576,263 | 3/1986 | Lane et al. | 192/0.044 |
| 4,702,127 | 10/1987 | Cote | 74/866 |
| 4,745,999 | 5/1988 | Brugger et al. | 192/83 |
| 4,841,816 | 6/1989 | 320514 | 74/866 |
| 4,899,619 | 2/1990 | Melnik et al. | 74/625 |

*Primary Examiner*—Rodney H. Bonck
*Attorney, Agent, or Firm*—C. H. Grace

[57] ABSTRACT

Manual override apparatus (38) for use in a vehicle having an automated mechanical transmission (10) or similar transmission, that enables limited driving of the vehicle in the event of a malfunction of the transmission's automatic electronic control system (30). The override apparatus includes a semi-manual arrangement (42, 44, 50, 58) for putting the transmission (10) in gear (46), disabling the electronic logic circuits (48), and actuating the clutch operator (22) from a manual lever-controlled valve (56, 40) in the cab. Another manual device (58) in the cab selectively enables and prevents manual control by the lever-controlled valve of the clutch operator (22).

3 Claims, 2 Drawing Sheets

MANUAL OVERRIDE FOR AUTOMATED MECHANICAL TRANSMISSION

FIELD

The invention relates to Automated Mechanical Transmissions (AMT) and similar transmissions for trucks and other motor vehicles, in which gears are shifted by powered actuators under the control of both an operator and an electronic control system.

The vehicles involved have throttle-controlled engines and their transmissions have a plurality of gear reduction ratios and control systems for shifting gears. Individual gear selections and shifting commands can be either (a) made automatically on the basis of measured and/or calculated parameters such as throttle position, vehicle or output shaft speed, input shaft or engine speed, and the like, or (b) made manually and executed automatically.

An invention in a related field is described in U.S. Pat. No. 3,937,108 entitled "Electronic and Hydraulic Control System for Automotive, Automatic Gear Change Transmissions", inventor Gerhard Will, issued Feb. 10, 1976.

SUMMARY

An Automated Mechanical Transmission (AMT) generally performs better than an unautomated type but its operation depends upon proper functioning of a rather complex electronic control system. If an electronic equipment failure should occur it could completely disable the vehicle. The present invention provides a manually operable override capability that permits an electronically disabled vehicle to be driven off the road to get it out of the way of other vehicles, or perhaps even to "limp home" a short distance to a repair station.

One object of the invention is to provide manual override apparatus for use in an AMT-equipped vehicle, that enables limited driving of the vehicle in the event of a malfunction of its electronic system.

Another object is to provide apparatus for use in a breakdown, involving manually-commanded gear engagement and a manual-commanded, interlock-type clutch operator.

DESCRIPTION OF THE PREFERRED EMBODIMENT

An AMT is a mechanical transmission and clutch that are automated by the addition of an electronic control system and actuators such as pneumatic or electromechanical operators. The example of the invention described below as a preferred embodiment is a portion of an electronic control system for controlling an AMT.

The disclosures of the following United States patents, which provide detailed information about the AMT environment, are incorporated herein by reference: U.S. Pat. Nos. 4,361,060; 4,551,802; 4,576,263; 4,702,127.

Figure 1:
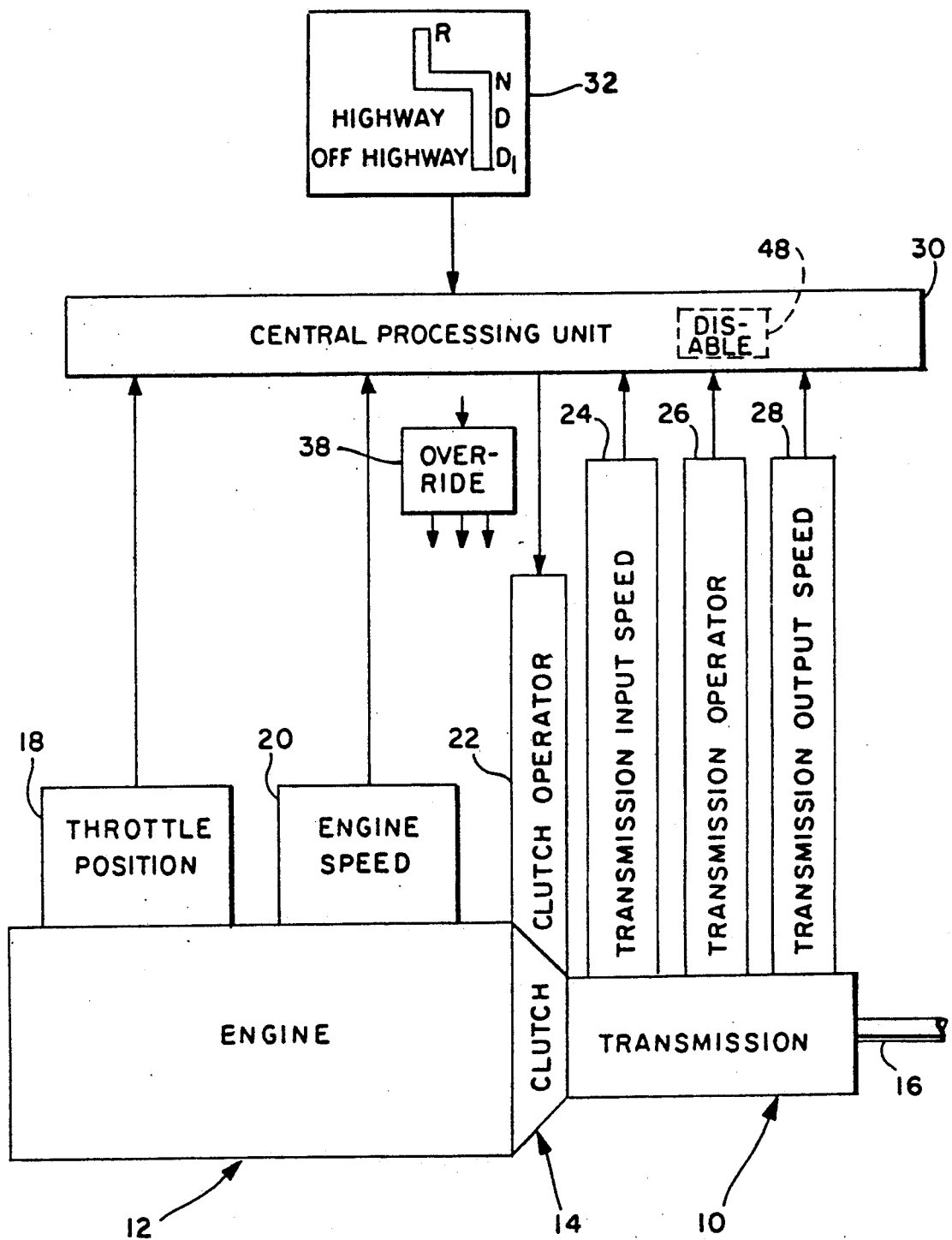
FIG. 1 is a simplified block diagram of major Components of an AMT and other truck components with which it operates.

Automated Manual Transmission, FIG. 1

FIG. 1 schematically illustrates an automatic multi-speed change-gear transmission 10 driven by a throttle-controlled engine 12, such as a diesel engine, through a master friction clutch 14. The automatic transmission 10 has an output shaft 16, which is adapted for driving connection to an appropriate vehicle component such as the differential of a drive axle, a transfer case or the like, as is well known in the prior art.

The above-mentioned power train components are monitored by and acted on by several devices, each of which is discussed briefly. These devices include a throttle-position monitor assembly 18, which senses the position of the operator-controlled throttle or other fuel-throttling device; an engine speed sensor 20, which senses the rotational speed of the engines a clutch operator 22 which engages and disengages the clutch 14; a transmission input shaft speed sensor 24; a transmission operator 26, which is effective to shift the transmission 10 into a selected gear ratio; and a transmission output shaft speed sensor 28.

The above-mentioned devices supply information to and/or accept commands from a central processing unit 30. The central processing unit 30 may include analog and/or digital circuitry for electronic calculation and logic (preferably using a microprocessor), the specific configuration and structure of which form are not relevant to the present invention.

The central processing unit (30) also receives information from a shift control assembly 32 by which the operator may select a reverse (R), neutral (N), on-highway forward drive (D) or off-road forward drive ($D_1$) mode of operation of the vehicle. Various alternative driver-input devices are sometimes used; for example, the driver may select a gear into which he wants the transmission to shift, and the control system performs the actual shifting when the shaft speeds and other parameters are correct for shifting.

An electrical power source (not shown) and/or source of pressurized fluid (29, FIG. 2) provides electrical and/or pneumatic power to the various sensing, operating and/or processing units. Drive train components and controls therefor of the type described above are known in the prior art and are described in greater detail in the above-mentioned U.S. Pat. Nos. 3,776,048; 4,038,889; 4,226,295 and 4,361,060.

Continuing with FIG. 1, the central processing unit 30 receives direct inputs from the sensor 18 indicating the present throttle position, from sensor 20 indicating the present engine speed, from sensor 24 indicating the present transmission input shaft speed, from sensor 28 indicating the present transmission output shaft speed and from sensor 32 indicating the mode of operation selected by the driver of the vehicle.

In addition to these direct inputs, the central processing unit 30 may derive data from internal circuitry for differentiating the input signal from sensor 20 to provide a calculated signal indicative of the rate of acceleration of the engine, for comparing the input signals from sensor 24 and 28 and calculating a current engaged-gear ratio, for comparing the current engaged-gear ratio with the signal from sensor 28 to provide a calculated engine speed, and from means for sensing full depression or release of the throttle.

The central processing unit 30 also comprises a memory means for storing certain input and calculated information, and a circuit for clearing the memory means upon the occurrence of a predetermined event. Additionally, the central processing unit may include a timing device for measuring a predetermined time interval, as a capacitor whose charge decays at a known rate and which may be reset upon the occurrence of a particular event.

Circuits for providing the foregoing functions are known in the prior art; an example may be seen in the aforementioned U.S. Pat. No. 4,361,060.

Of course, when the system is locked-up (master clutch 14 not slipping), the input shaft speed and the engine speed are equal. Having input signals indicative of any two of: engine (or input shaft) speed, output shaft speed, and currently engaged drive ratio, enables the processing unit to calculate the third of these parameters. Further, when the vehicle's drive train design is known, the output-shaft speed is proportional to the speed of the vehicle.

The memory means incorporated into the central processing unit 30 may store information such as the direction of the last shift (i.e. upshift or downshift), position of the throttle, rate of change of throttle position, vehicle speed and the like. The memory means may be reset upon the occurrence of a specified event such as exceeding of a predetermined threshold value by the engine speed or vehicle speed, full application of the throttle, exceeding of a predetermined limit by the operator's throttle setting, shifting of gears, etc.

Sensors 18, 20, 24 and 28 may be of any known type or construction for generating suitable analog or digital signals responsive to the parameters that they monitor. Similarly, operators 22 and 26 may be of any known electrical, pneumatic or electro-pneumatic type for executing operations in response to command signals from the processing unit 30. Sensor 18 may also be an operator to control the fuel supply to the engine to achieve an engine speed suitable for synchronous shifting.

The clutch operator 22 is preferably controlled by the central processing unit 30 (by means of a valve 45) to engage and disengage the master clutch 14 as described in U.S. Pat. No. 4,081,065, hereby incorporated by reference. The transmission 10 may include synchronizing means, such as an accelerator and/or a brake mechanism as described in U.S. Pat. No. 3,478,851, incorporated herein by reference. The transmission 10 is preferably but not necessarily of the twin-countershaft type described in U.S. Pat. No. 3,105,395, also incorporated by reference.

Figure 2:
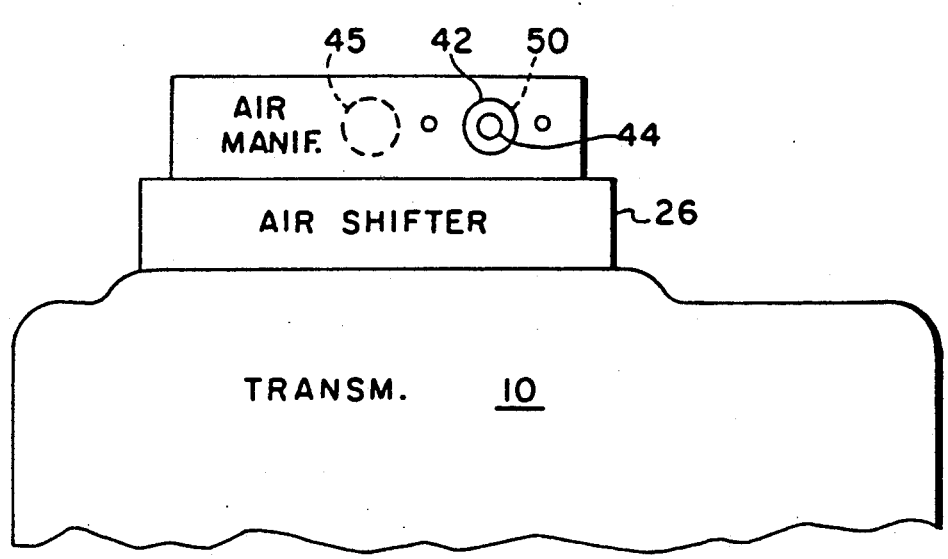
FIG. 2 is a simplified end view schematic illustration of the same AMT with a small cover removed to show the end of a screw for engaging a gear.
Figure 3:
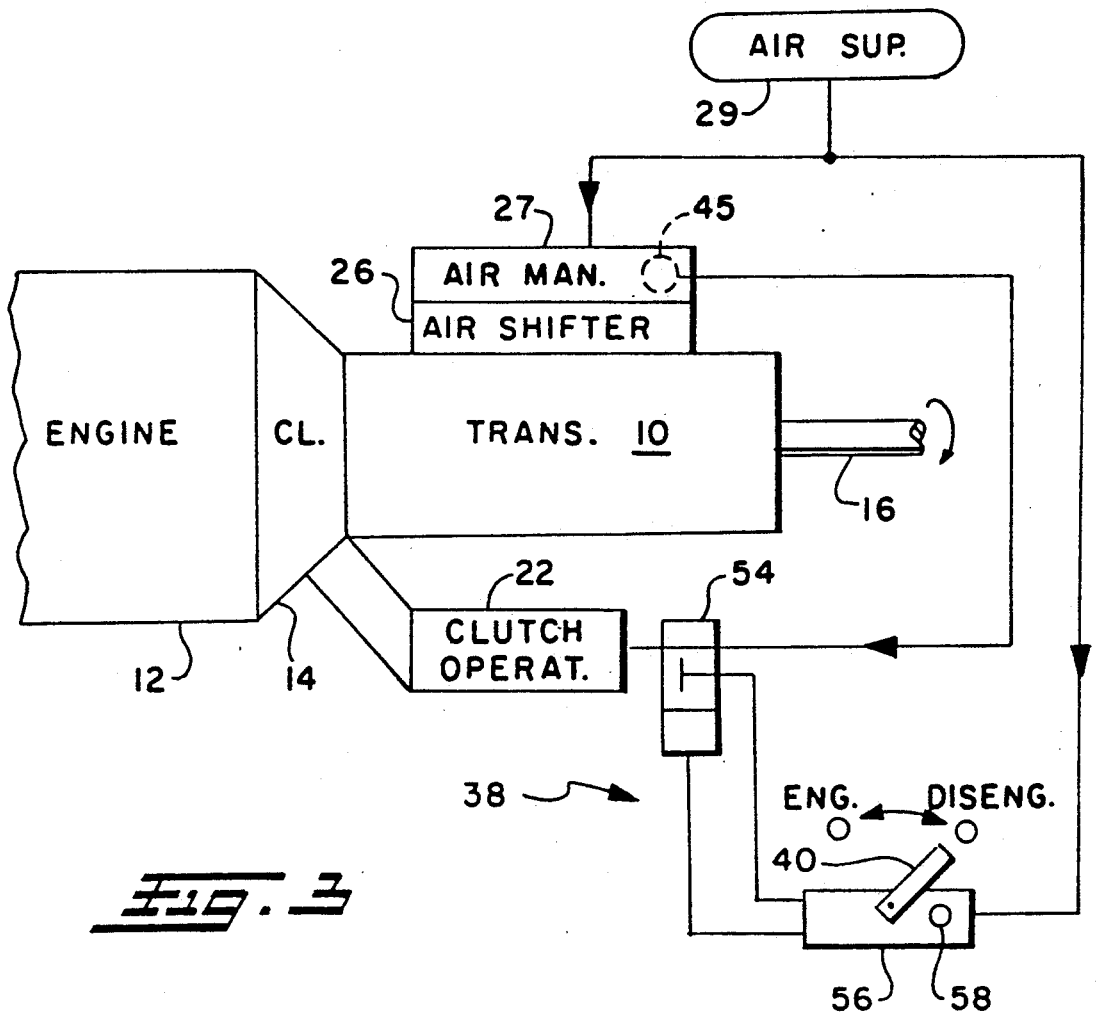
FIG. 3 is a simplified side view schematic illustration of the same AMT showing manual override components.

Manual Override System, FIGS. 2 and 3

Override of a malfunctioning electronic system is accomplished by disabling the automated logic functions to whatever extent is necessary, putting the transmission 10 in gear, and controlling the clutch operator 22 from an override lever 40 in the cab. The override system (generally indicated as 38 on FIG. 3), therefore requires modifications of or additions to previous AMT controls as follows;

1. Capability is provided for manually overriding a solenoid 42, which is in an air manifold 27 connected with the transmission operator 26 and ordinarily controls a pneumatic valve for shifting the transmission 10 (see FIG. 2). The particular valve 42 is capable of engaging a particular predetermined gear ratio of the front gear box 10. To Override the solenoid valve 42, a screw 44 on it is turned by hand. Turning of the screw 44 engages the predetermined gear ratio.

2. The system 38 for manual override also preferably disables certain AMT logic circuits 48 (FIG. 1) in the central processing unit 30 during override. That can be accomplished by means of an electrical switch 50 that is also actuated when the screw 44 is turned (FIG. 2). Actuation of the switch 50 disables the logic circuits 48, or if desired, the entire central processor unit 30.

3. An air supply 29 is used under both normal (i.e., automatic) conditions and manual override conditions. Under normal conditions it actuates the clutch operator 22 through a solenoid valve 45 in the air manifold 27. A pilot valve 54 is provided, preferably located near the clutch operator 22, to transfer the controlling input of the clutch operator 22 from automatic operation by solenoid valve 45 to manual operation by a valve 56 (FIG. 3). The pilot valve 54 is switched from automatic to manual Positions by operation of an interlock device 58 described below. The pilot valve 54 also has an orifice to achieve appropriate pneumatic force modulation for engagement of the master clutch 14.

4. The manually operated valve 56 is provided in the cab to enable a driver during override to engage the clutch 14, which he does by moving a lever 40 (FIG. 3). The manually operated valve 56 receives air from the air supply 29. A manually actuated interlock device 58 on the manually operated valve 56 prevents accidental clutch engagement. Device 58 must be moved first, to cause the pilot valve 54 to select manual override operation instead of automatic operation. Thereafter engagement and disengagement of the clutch operator 22 is controllable by the lever 40.

Scope of the Invention

One embodiment of the invention is described, but many other embodiments are Possible within the scope of the invention as claimed.

What is claimed is:

1. A manual override system (38) for use in a vehicle that has an automated mechanical transmission system including a transmission (10), an electronic control system (30, etc) for normal control of the automated system when the system is not disabled, a transmission operator (26) for putting the transmission in a gear ratio, a clutch (14), a fluid-actuated clutch operator (22), and normal fluid control apparatus (29, 45) for automatic actuation of the clutch operator when the system is not disabled, comprising:

overriding means (44) for placing said transmission (10) in a predetermined gear ratio;

overriding fluid control apparatus (29, 56) for manual actuation of the clutch operator (22) when the normal system is disabled, means (54, 58) for substituting said overriding fluid control apparatus (56) for said normal fluid control apparatus (45);

and wherein said means (54, 58) for substituting said overriding fluid control apparatus (56) for said normal fluid control apparatus (45) comprises manually releasable lock means (58) for preventing inadvertent manual operation of the clutch (14).

2. A manual override system (38) for use in a vehicle that has an automated mechanical transmission system including a transmission (10), an electronic control system (30, etc) for normal control of the automated system when the system is not disabled, a transmission operator (26) for putting the transmission in a gear ratio, a clutch (14), a fluid-actuated clutch operator (22), and normal fluid control apparatus (29, 45) for automatic actuation of the clutch operator when the system is not disabled, comprising:

overriding means (44) for placing said transmission (10) in a predetermined gear ratio;

overriding fluid control apparatus (29, 56) for manual actuation of the clutch operator (22) when the normal system is disabled;

means (54, 58) for substituting said overriding fluid control apparatus (56) for said normal fluid control apparatus (45);

and wherein said means (54, 58) for substituting said overriding fluid control apparatus (56) for said normal fluid control apparatus (45) comprises valve means (54) for interdicting fluid communication from said normal fluid control apparatus (45) to said clutch operator (22) and connecting said overriding fluid control apparatus (56) to said clutch operator (22).

3. A manual override system as in claim 2 and wherein said means (54, 58) for substituting comprises pilot valve means (54) for substituting said overriding fluid control apparatus (56) for said normal fluid control apparatus (45), and said pilot valve means is controllable by manual means (56, 40) spaced apart from said pilot valve means, for selectively engaging and disengaging said clutch.

* * * * *